(12) United States Patent
Fowler

(10) Patent No.: US 11,130,547 B2
(45) Date of Patent: Sep. 28, 2021

(54) SYSTEMS AND METHODS ASSOCIATED WITH MAGNETICALLY ACTIVATED MECHANICAL BINDING FOR PEDALS

(71) Applicant: Houston Partners, LLC, Houston, TX (US)

(72) Inventor: Gerald Fowler, Houston, TX (US)

(*) Notice: Subject to any disclaimer, the term of this patent is extended or adjusted under 35 U.S.C. 154(b) by 0 days.

(21) Appl. No.: 17/074,083

(22) Filed: Oct. 19, 2020

(65) Prior Publication Data

US 2021/0129936 A1 May 6, 2021

Related U.S. Application Data

(63) Continuation of application No. 62/930,242, filed on Nov. 4, 2019.

(51) Int. Cl.
*B62M 3/08* (2006.01)
*H01F 7/02* (2006.01)

(52) U.S. Cl.
CPC ............... *B62M 3/086* (2013.01); *H01F 7/02* (2013.01)

(58) Field of Classification Search
CPC ..................................................... B62M 3/086
See application file for complete search history.

(56) References Cited

U.S. PATENT DOCUMENTS

| | | | |
|---|---|---|---|
| 3,516,701 A | 6/1970 | Graham | |
| 3,667,771 A | 6/1972 | Larson | |
| 5,473,963 A | 12/1995 | Aeschbach | |
| 5,737,977 A | 4/1998 | Surdi et al. | |
| 6,331,007 B1 * | 12/2001 | Bryce | B63B 32/45 |
| | | | 280/11.3 |
| 9,038,502 B2 | 5/2015 | Zoumaras et al. | |
| 2008/0229875 A1 | 9/2008 | Ray | |
| 2010/0308549 A1 | 12/2010 | Rivard | |
| 2011/0056094 A1 | 3/2011 | Yanke et al. | |
| 2011/0108373 A1 | 5/2011 | Toal | |
| 2014/0224062 A1 | 8/2014 | Vgliotti et al. | |
| 2019/0168842 A1 * | 6/2019 | Ball | A43B 1/0054 |

\* cited by examiner

*Primary Examiner* — Vicky A Johnson
(74) *Attorney, Agent, or Firm* — Pierson IP, PLLC

(57) ABSTRACT

A mechanical binding that is opened and closed via magnetic forces. This may allow for systems to utilize a strong mechanical lock that is activated and deactivated with simple magnetic mechanisms, allowing for a simple and compact design.

18 Claims, 6 Drawing Sheets

SYSTEMS AND METHODS ASSOCIATED WITH MAGNETICALLY ACTIVATED MECHANICAL BINDING FOR PEDALS

BACKGROUND INFORMATION

Field of the Disclosure

Examples of the present disclosure are related to systems and methods for mechanical bindings that are set and unset magnetically. Specifically, embodiments are related to moving a mechanical binding via magnets to secure a cleat in place, wherein the mechanical binding is moved based on the relative positions of a first set of magnets on the cleat and a second set of magnets on a pedal.

Background

A bicycle pedal is the part of a bicycle that the rider pushes with their foot to propel the bicycle. A clipless pedal provides a mechanical connection between the cyclists' foot and the crank. Conventionally, clipless pedals require a cleat on a shoe that locks into a mechanism in the pedal, which couples the shoe with the pedal.

Clipless pedals allow the rider to apply a downward force to move a mechanical locking mechanism, and then to the rider may twist their heal to release the shoe from the mechanical locking mechanism. To engage the mechanism, however, the rider must typically overcome the force of a strong metal spring. This can lead to situations where it is difficult for a rider to both enter and exit the pedal assembly, which can create a dangerous situation for both experienced and novice riders.

Other magnetic binding systems utilize magnets positioned on their shoe to directly interface with magnets positions on the pedal. However, because these arrangements rely directly, they necessarily utilize large and heavy magnets to effectively lock the pedal and cleat together. This makes existing magnetic pedal designs impractical.

Accordingly, needs exist for utilizing a mechanical binding that is opened and/or closed via magnets to secure a cleat in place, wherein the mechanical binding is moved based on the relative positions of a first set of magnets on the cleat and a second set of magnets on a pedal.

SUMMARY

Embodiments described herein are directed towards a mechanical binding that is opened and/or closed via magnetic forces. This allows for systems that create a strong mechanical lock that is easily activated and/or deactivated with simple magnetic mechanisms. By allowing the movement of the mechanical lock to be opened and/or closed based on the alignment of sets of magnets, the locking mechanism may be operated with a two-way operation utilizing the magnets rather than a conventional one-way operation of springs.

Embodiments may include a pedal and a cleat.

The pedal may include a receiving orifice, clamp, and first set of magnets.

The pedal may be a lever designed to be operated by a foot of a cyclist, and be coupled to the crank of a bicycle. The pedal may be configured to receive forces from the cyclist and transfer these forces to the crank. In other embodiments, the pedal may be any movable element configured to transfer forces The receiving orifice may be an opening within a body of the pedal that is configured to receive the cleat. The receiving orifice may extend completely through the pedal, or only a portion of the pedal. The receiving orifice may extend from a first face of the pedal towards a second face of the pedal. In embodiments, the receiving orifice may be cylindrical in shape, wherein the cylinder forms an annulus from an upper surface of the pedal to a lower surface of the pedal. However, in other embodiments, the receiving orifice may be any desired shape.

The clamp may be embedded within the receiving orifice, such that the clamp is positioned between an inner diameter and outer diameter of the clamp, which may also be positioned between the upper and lower surfaces of the pedal. The clamp may be configured to radially expand and/or retract in a direction that is orthogonal to a central axis of the receiving orifice. Responsive to the clamp retracting, in a first position, an inner diameter across the annulus may decrease in size. In a second position, when expanding the clamp the inner diameter across the annulus may increase in size. The changing of the diameter across the annulus may be configured to apply a locking force against a cleat in the first position, and release the locking force in the second position. In further embodiments, the clamp may include a ridge extending along the inner circumference of the clamp. The ridge may be a projection that is configured to be inserted into a groove of the cleat. Furthermore, the clamp may include a hinge that is configured to allow clamp to rotate about a fixed axis, wherein a first end of the clamp remains fixed in place and a second end of the clamp is configured to rotate inward to decrease the inner diameter across the annulus and rotate outward to increase the inner diameter across the annulus. In embodiments, the hinge may cause the clamp to naturally be positioned in the second position if outside forces are not applied to the hinge.

The first set of magnets may be positioned on the inner circumference of the clamp. The first set of magnets may include magnets having a first polarity and magnets having a second polarity, which may be positioned in a predetermined or known arrangement.

The cleat may be configured to be positioned on a riding shoe of the cyclist. The cleat may be shaped to correspond to the shape of the receiving orifice, such that the cleat may be inserted into the annulus. For example, the cleat may be substantially cylindrical in shape when the receiving orifice is cylindrical in shape. The cleat may include a groove and a second set of magnets.

The groove may be an indentation, dimple, notch, etc. extending around the outer circumference of the cleat. In implementations, the groove may extend around an entirety or only portions of the outer circumference of the cleat. The groove may be defined by an upper sidewall, lower sidewall, and inner sidewall. In embodiments, the groove may be configured to align with the ridge of the clamp, such that the ridge may be inserted into the groove when the clamp is in the first position. The upper sidewall may be configured to form an upper ledge to restrict the upward movement of the cleat relative to the pedal when the clamp is in the first position, and the lower sidewall may be configured to form a lower ledge to restrict the downward movement of the cleat relative to the pedal when the clamp is in the first position.

The second set of magnets may be positioned around the outer circumference of the cleat. The second set of magnets may include at least one magnets having a first polarity and/or magnets having a second polarity. Accordingly, in embodiments, the second set of magnets may include a single magnet of a first polarity or the second set of magnets may include magnets of both polarities, which may be positioned in a predetermined or known arrangement. In embodiments where the second set of magnets includes magnets of both polarities, the arrangement of the polarities of the first set of magnets and second set of magnets may be configured to align such that each of the first set of magnets and second set of magnets create an attracting force when the cleat and clamp are in the first position, and each of the first set of magnets and second set of magnets create a repulsive force when the cleat and clamp are in the second position. In embodiments, where the first set of magnets includes only a magnet of a first polarity, the single magnet may be configured to align with a magnet of the second polarity within the clamp to be in the first position. Responsive to rotating the single magnet of the first polarity within the cleat to be aligned with a magnet of the first polarity within the clamp, the clamp may be in the second position. Accordingly, embodiments may only use a single magnet within the cleat, wherein the relative rotational positioning of the single magnet with the magnets of different polarities within the pedal may cause the clamp to close and form a lock or open.

In implementations, the cleat may be positioned within the receiving orifice of the pedal at a first angular offset in a first position. This may align the polarities of each of the first set of magnets with a corresponding second set of magnets to be attracted to each other. When the magnets are aligned with each other the distance, the attraction force may cause the distance between the sets of magnets to decrease, positioning the magnets in the second position. In the second position, the ridge may be encompassed by the groove to limit the orthogonal movement of the pedal relative to the movement of the clamp while allowing for rotational movement of the cleat relative to the pedal. Further, in the second position, the inner diameter across the ridge may be smaller than the outer diameter of the cleat. In other embodiments, the clamp may be positioned within the cleat, and configured to move towards the inner circumference of the stationary receiving orifice.

When the cyclist wishes to detach from the pedal, they may rotationally move the cleat relative to the pedal to create a second angular offset between the cleat and the pedal. This may cause each of the first set of magnets to apply a repulsive force towards the second set of magnets, allowing the clamp to move between from the second position back to the first position. When in the first position, the inner diameter across the ridge may be greater than that of the outer diameter of the cleat. This may allow the orthogonal movement of the pedal relative to the movement of the clamp.

As such, embodiments may allow a cyclist to easily and efficiently enter or exit a clipless pedal, making the use of the pedals and cleats more user friendly, safe, and effective.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions, or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
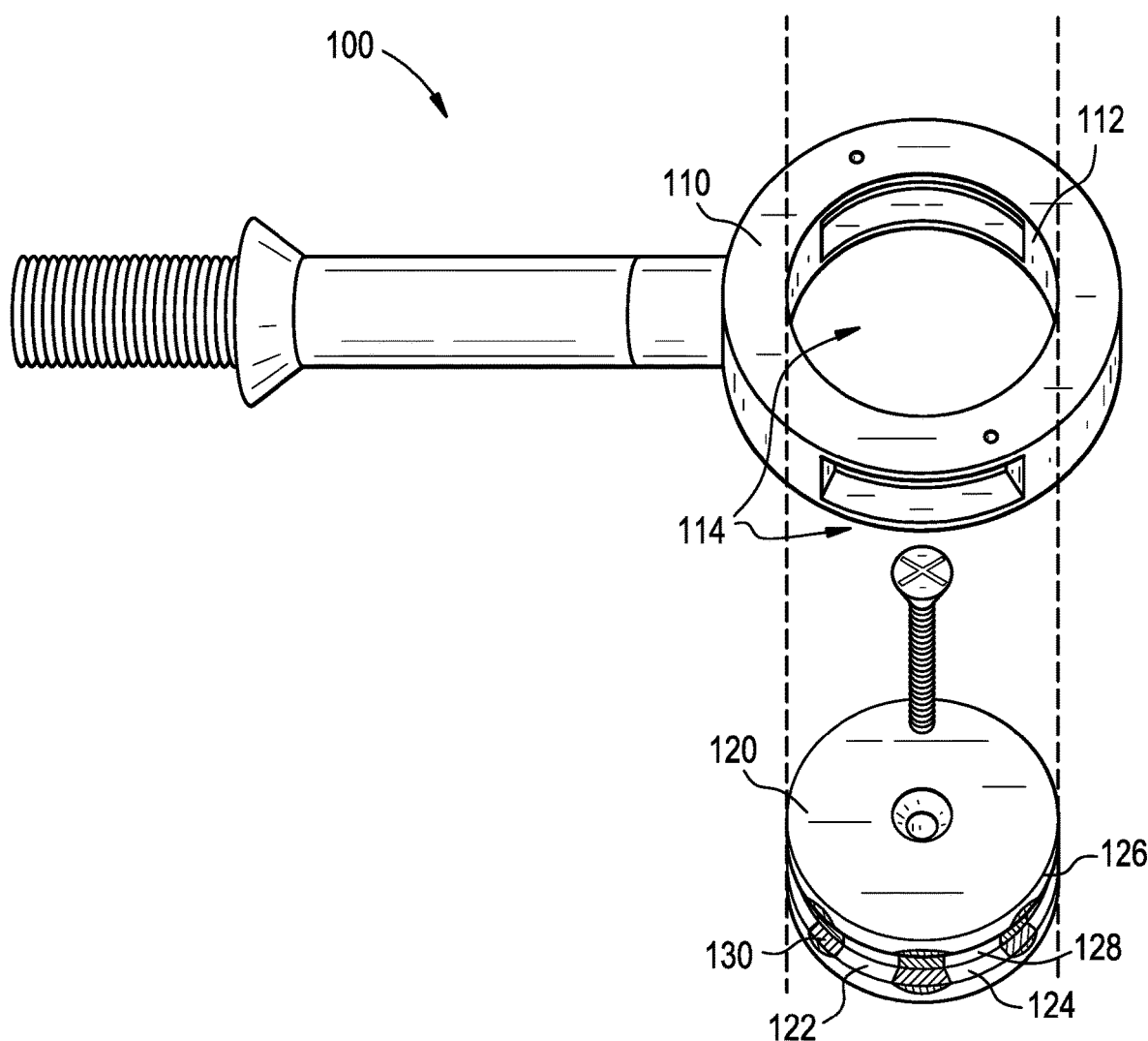
FIG. 1 depicts a mechanical binding system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent to one having ordinary skill in the art, that the specific detail need not be employed to practice the present embodiments. In other instances, well-known materials or methods have not been described in detail in order to avoid obscuring the present embodiments.

FIG. 1 depicts a binding system 100, according to an embodiment. Binding system 100 may utilize mechanical locks to allow a pedal and cleat to be releasable coupled together, wherein magnets control the positioning of the mechanical locks. Binding system 100 may include a pedal 110 and cleat 120.

Figure 2:
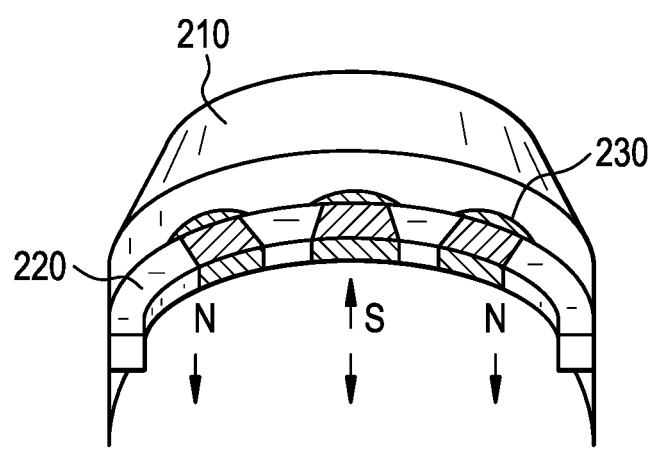
FIG. 2 depicts a detailed view of a clamp, according to an embodiment.

Pedal 110 may include receiving orifice 112, at least one channel 114, and clamp with a first set of magnets (depicted in FIG. 2). Pedal 110 may be a lever designed to transfer forces from a foot of a cyclist to a crank. In other embodiments, pedal 110 may be any movable element configured to mechanically transfer forces from a first device to a second device.

Receiving orifice 112 may be an annulus, cutout, hole, slot, etc. extending from a first face of pedal 110 towards a second face of pedal 110, wherein the first face is an upper surface and the second face is a lower surface. In embodiments receiving orifice 112 may extend across the entire body of pedal 110 or only across a portion of the body of pedal 110, such that receiving orifice 112 does not extend from the upper surface to the lower surface of pedal 110.

Channels 114 may be positioned on an inner circumference of receiving orifice 112 and extend towards an outer circumference of pedal 110. Channels 114 may be configured to house clamps, and allow the clamps to move radially towards and away from a central axis of pedal 110. This may allow the clamps to dynamically change an inner diameter across the clamps and receiving orifice 112. In embodiments, channels 114 may be positioned on opposite sides of pedal, which are misaligned with a central axis of a crank.

The positioning of the channels 114 may allow for a float that is orthogonal with the central axis of the crank, which may limit inadvertent decoupling of the mechanical lock. In embodiments, the clamp may be configured to move alone a linear axis or be coupled to pedal 110 via a hinge. When the clamp is coupled to pedal 110 via a hinge that is embedded within channel 114, the clamp may have a first end that is fixed in place and a second end that is configured to rotate. Responsive to the second end of the clamp rotating inward, an inner diameter across receiving orifice 112 may decrease. Responsive to the second end of the clamp rotating outward, the inner diameter across receiving orifice 112 may increase.

Cleat 120 may be configured to be positioned on a riding shoe of the cyclist. Cleat 120 may be shaped to correspond to the shape of the receiving orifice 112, such that the cleat may be inserted into the receiving orifice 112. For example, cleat 120 may be substantially cylindrical in shape when the receiving orifice 112 is cylindrical in shape. The outer diameter of cleat 120 may have a fixed profile that has a fixed—variable diameter from a first face of cleat 120 to a second face of cleat 120, wherein the first face of cleat 120 is an upper surface and the second face of cleat 120 is a lower surface. The variable diameter of cleat 120 may be created by a groove 122 positioned on the outer circumference of cleat 120.

Groove 122 may be an indentation, dimple, notch, etc. extending along, or portions of, the outer circumference of cleat 120 towards the center of cleat 120. Groove 122 may be configured to decrease the outer circumference of cleat 120 at desirable locations, such that a ridge on the clamps may be removably inserted into groove 122 when the clamps cause receiving orifice 112 to have a smaller inner diameter after inserting cleat 120 completely into pedal 110. Groove 122 may be defined by a lower sidewall 124, upper sidewall 126, and inner sidewall 128. In embodiments, groove 122 may be configured to align with the ridge of the clamp, such that the ridge may be inserted into groove 122 when the clamp is in the first position. Upper sidewall 126 may be configured to form an upper ledge to restrict the upward movement of the cleat 120 relative to the pedal 110 when the clamp is in the first position. Lower sidewall 124 may be configured to form a lower ledge to restrict the downward movement of cleat 120 relative to the pedal 110 when the clamp is in the first position. Inner sidewall 128 may be configured to restrict the radial movement of the clamp towards the central axis of receiving orifice 112 to a distance wherein the ridge of clamp is fully encompassed by groove 122.

Second set of magnets 130 may be positioned around the outer circumference of cleat 120. Second set of magnets 130 may include magnets having a first polarity and magnets having a second polarity, which may be positioned in a predetermined or known arrangement. The arrangement of the polarity of the first set of magnets and second set of magnets 130 may be configured to align such that each of the polarities of the first set of magnets and second set of magnets 130 to create an attracting force when the cleat 120 and clamp are in the first position, and each of the polarities of the first set of magnets and second set of magnets 130 create a repulsive force when the cleat 120 and clamp are in the second position. In other embodiments, second set of magnets 130 may only include magnets of a first polarity, which are configured to be aligned with magnets of the same polarity and different polarity positioned on the clamp to create an repulsive force or an attractive force, respectively.

FIG. 2 depicts a clamp 210 configured to be housed within a channel 114, according to an embodiment. Clamp 210 may be configured to move radially to increase or decrease an inner diameter across ridge 220 based on the relative positioning of first set of magnets 230 and second set of magnets 130. This may enable a mechanical lock to be formed based on magnetic attraction. Clamp 210 may include a ridge 220 and first set of magnets 230.

Ridge 220 may be a projection, bump, outcrop, etc. extending away from a body of clamp 210, wherein a height of ridge 220 is smaller than that of clamp 210 and groove 122. Ridge 220 may be configured to be vertically aligned with groove 122 when cleat 120 is inserted into pedal 110.

First set of magnets 230 of magnets may be positioned on the inner circumference of clamp 210. First set of magnets 230 may include magnets having a first polarity and/or magnets having a second polarity, which may be positioned in a predetermined or known arrangement.

In implementations, the first set of magnets 230 and second set of magnets 130 may move between a first position and second position by a cyclist rotating their shoe to correspondingly rotate cleat 120 to change the angular offset between cleat 210 and pedal 110. As such, responsive to rotating cleat 120 while pedal 110 remains stationary, the first set of magnets 230 and the second set of magnets 130 may create an attractive force in the first position and a repulsive force in the second position.

In embodiments, responsive to aligning polarities of the first set of magnets 230 with the polarities of second set of magnets 130 to be opposite polarities in the first position, wherein the angular offset between the first set of magnets 230 and the second set of magnets 130 is a first degree, each of the first set of magnets 230 may be form an attraction force with each of the magnets within the second set of magnets 230. This may cause ridge 220 to move towards a central axis of clamp 210 and decreasing the diameter across clamp 210. This may cause the diameter across clamp 210 to be less than a diameter across the faces of cleat 210. Further, in the first position, ridge 220 may be encompassed by groove 122, which limits the vertical movement of cleat 120 relative to pedal 110, forming a mechanical lock.

Responsive to aligning the polarities of the first set of magnets 230 with the polarities of the second set of magnets 130 to be opposite polarities in the second position, wherein the angular offset between the first set of magnets 230 and the second set of magnets is a second degree, each of the first set of magnets 230 may form a repulsion force with each of the magnets within the second set of magnets 230.

In the second position, ridge 220 may move away from the central axis of clamp 210 and increasing the diameter across clamp 210. This may cause the diameter across clamp 210 to be greater than the diameter across the faces of cleat 210, which may allow cleat 210 to move vertically with respect to pedal 110.

Figure 3:
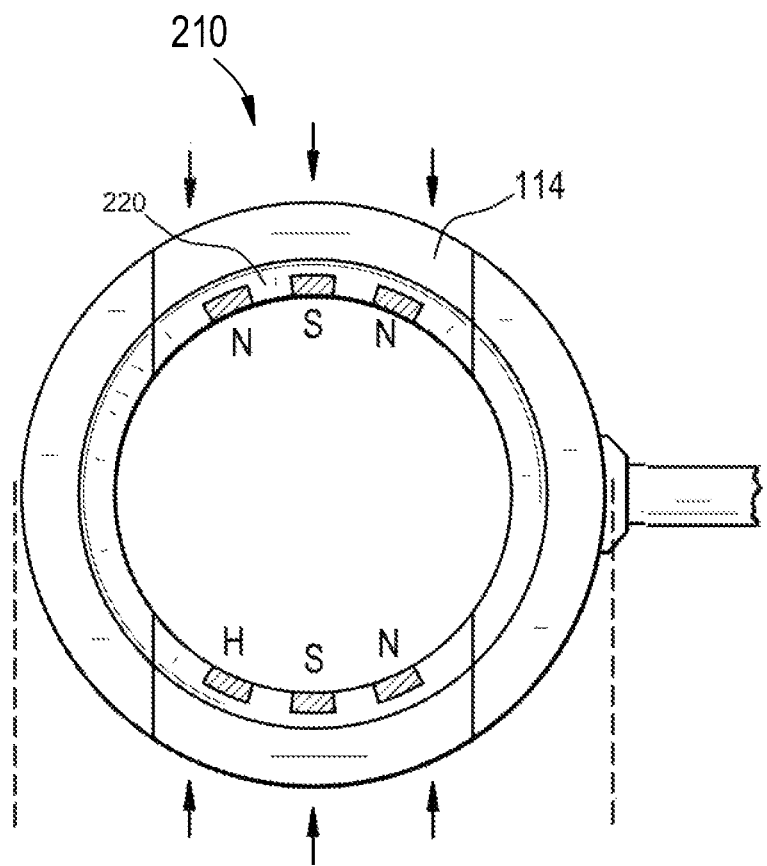
FIG. 3 depicts a top view of a pedal, according to an embodiment.
Figure 4:
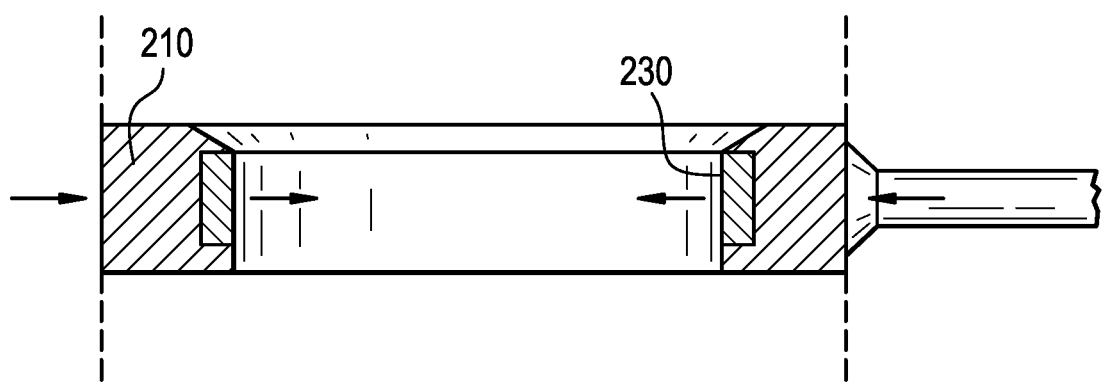
FIG. 4 depicts a cross section view of a pedal, according to an embodiment.

FIGS. 3 and 4 depict clamps 210 positioned within channels 114, according to an embodiment. More specifically, FIG. 3 depicts an embodiment with clamps 210 in the first position due to no second set of magnets being present and/or aligned with first set of magnets 230. When in the first position, an inner diameter across clamps 210 may be substantially the same as the inner diameter cross receiving orifice 112. This may allow a cleat 120 to be positioned within receiving orifice due to the larger inner diameter.

Responsive to positioning a cleat 120 within the receiving orifice 112 and aligning the polarities of the first set of magnets with the polarities of second set of magnets to have an attraction force, clamp 210 may radially move towards a central axis of receiving orifice to reduce the inner diameter across clamp 210. This may secure cleat 120 in place within the receiving orifice 112. Responsive to rotating cleat 120 while cleat 120 is positioned within receiving orifice 112 to have a second angular offset with regards to clamp 110, the first set of magnets and the second set of magnets may have a repulsion force. This may radially move clamp 210 away from the central axis or receiving orifice, which may allow cleat 120 to disengage from pedal 110.

Figure 5:
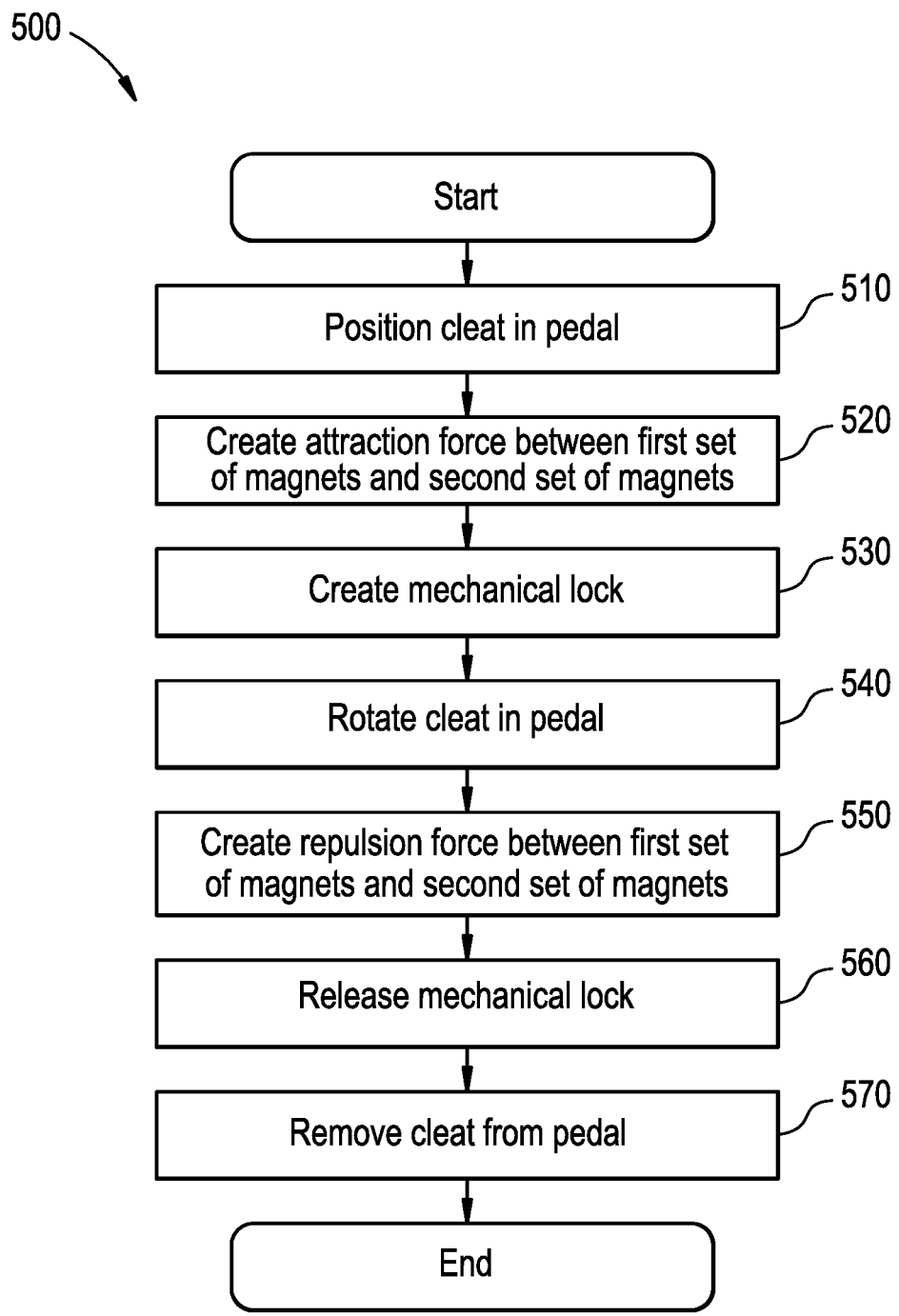
FIG. 5 depicts a method of using a mechanical binding system, according to an embodiment.

FIG. 5 depicts a method 500 for utilizing a clipless pedal, according to an embodiment. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

At operation 510, a cyclist may insert a cleat coupled with their shoe into a receiving orifice.

At operation 520, based on a first angular offset of the cleat and the pedal, polarities associated with first set of magnets positions on the pedal may be aligned with opposite polarities associated with a second set of magnets on the cleat to create an attraction force.

At operation 530 the attraction force may cause a clamp embedded within the pedal to move towards a central axis of the receiving orifice, decreasing a size of an inner diameter across the clamp. This may cause a ridge associated with the clamp to be inserted into a groove associated with the cleat, and creating a mechanical lock between the clamp and pedal.

At operation 540, while the ridge is positioned within the groove, the cyclist may rotate the cleat to create a second angular offset between the cleat and the pedal.

At operation 540, the rotation of the cleat to create the second angular offset may cause the polarities of the first set of magnets positioned on the pedal to be aligned with the same polarities second set of magnets.

At operation 550, responsive to aligning polarities of the first set of magnets and the second set of magnets to be the same, the attraction force may be removed and a repulsion force may be created.

At operation 560, the repulsion force may cause the clamp embedded within the pedal to move away from the central axis of the receiving orifice. This may cause a ridge associated with the clamp to no longer be inserted into a groove associated with the cleat, and releasing the mechanical lock between the clamp and pedal.

At operation 570, the cyclist may laterally move their shoe and cleat away from the lock.

Figure 6:
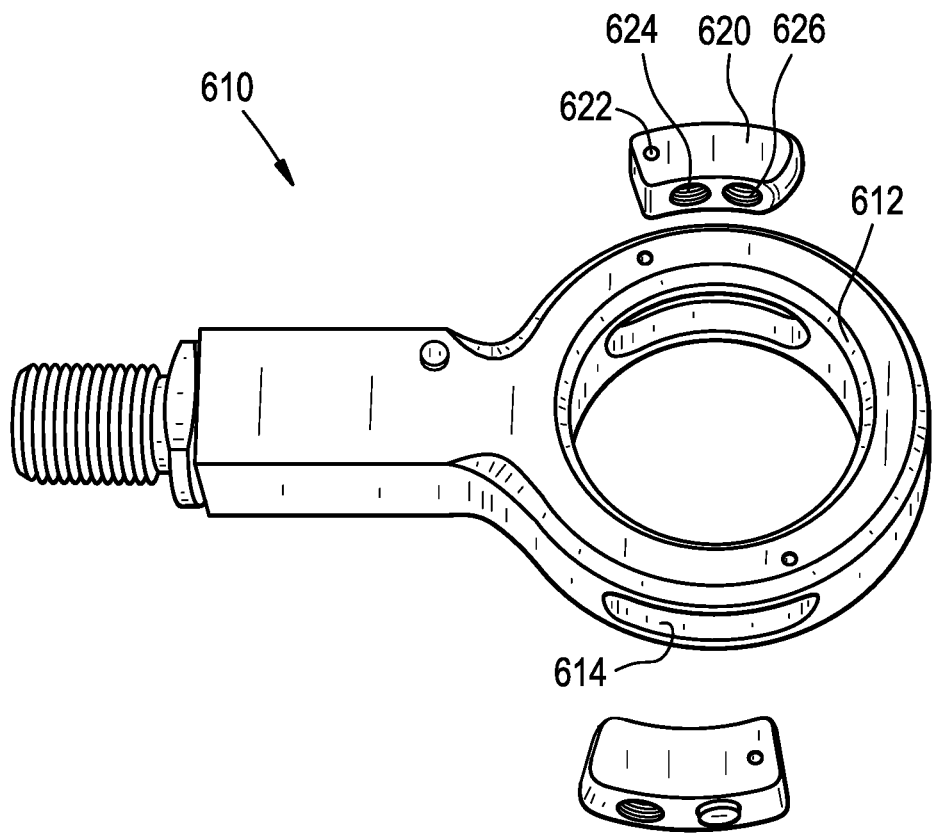
FIG. 6 depicts a pedal, according to an embodiment.

FIG. 6 depicts a pedal 610, according to an embodiment. Elements depicted in FIG. 6 may be described above, and for the sake of brevity a further description of these elements may be omitted. Pedal 600 may include a receiving orifice 612, channel 614, and clamp 620.

Receiving orifice 612 may be positioned from an upper surface to a lower surface of pedal 610 to form an inner diameter. Channel 614 may be embedded within the sidewalls of pedal 610 and have an opening that is positioned orthogonal to the annulus formed by receiving orifice 612.

Clamp 620 may be configured to be coupled to pedal 610 within channel 614 via a hinge 622. Hinge 622 may be configured to allow a first end of clamp 620 to be fixed in place, while allowing a second end of clamp 620 to rotate. In a first position, the second end of clamp 620 may be positioned within the inner diameter of receiving orifice to reduce the inner diameter across receiving orifice 620. In a second position, the second end of clamp 620 may be positioned away from the outer diameter of pedal 610. In embodiments, when no outside forces are acting upon clamp 620 then clamp 620 may normally be in the second position.

Clamp 620 may include a first magnet 624 of a first polarity and a second magnet 626 of a second polarity positioned in series. The positioning of the first magnet 624 and second magnet 626 in series allows the magnets to be positioned at different angular offsets with respect to the inner circumference of receiving orifice 612. In embodiments, the first magnet 624 may be configured to align with a third magnet positioned on a cleat to create an attraction force and move the clamp 620 from the second position to the first position. Responsive to the second magnet 626 being aligned the third magnet a repulsion force may be created, moving clamp 620 from the first position to the second position.

As shown in FIG. 6, pedal 610 may have multiple clamps 620, which may be positioned on opposite sides of receiving orifice 612. This may allow multiple clamps 620 to exert forces against the pedal to lock the pedal in place in the first position.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, and methods.

What is claimed is:

1. A mechanical binding system comprising:
   a pedal with an annular receiving orifice, the annular receiving orifice extending from an upper surface of the pedal towards a lower surface of the pedal;
   a clamp with a first magnet of a first polarity and a second magnet of a second polarity, wherein the first polarity and second polarity are different polarities, the clamp being configured to move in a direction orthogonal to a height of the annular receiving orifice to decrease or increase an inner diameter across the annular receiving orifice.

2. The system of claim 1, further comprising:
   a channel with an open inner face, the open inner face being exposed to the annular receiving orifice, wherein a first end of the clamp is configured to be positioned outside of the channel within the annular receiving orifice in a first position and the first end of the clamp is configured to be positioned within the channel in a second position.

3. The system of claim 2, further comprising:
a cleat being configured to be inserted into the receiving orifice when the clamp is in the second position, the cleat including a third magnet having the first polarity.

4. The system of claim 3, wherein the cleat is cylindrical in shape.

5. The system of claim 3, wherein the third magnet is configured to be aligned with the first magnet to move the clamp towards a central axis of the annular receiving orifice to decrease the inner diameter across the receiving orifice.

6. The system of claim 5, wherein the third magnet is configured to be aligned with the second magnet to move the clamp away from the central axis of the annular receiving orifice to increase the inner diameter across the receiving orifice.

7. The system of claim 6, wherein the pedal is configured to be moved into the annular receiving orifice before aligning the first magnet and the third magnet.

8. The system of claim 7, wherein the first magnet and the third magnet move the clamp against the cleat to form a mechanical lock.

9. The system of claim 3, wherein an outer diameter of the cleat includes a groove, the groove being configured to receive the clamp in the first position.

10. A method for a mechanical binding system comprising:
positioning a clamp with a first magnet of a first polarity and a second magnet of a second polarity within a pedal, wherein the first polarity and second polarity are different polarities the pedal having an annular receiving orifice extending from an upper surface of the pedal towards a lower surface of the pedal;
moving the clamp in a direction orthogonal to a height of the annular receiving orifice to decrease or increase an inner diameter across the annular receiving orifice.

11. The method of claim 10, further comprising:
positioning, in a first position, a first end of a clamp outside of a channel within the annular receiving orifice;
positioning, in a second position, the first end of a clamp within the annular receiving orifice, the channel having an open inner face, the open inner face being exposed to the annular receiving orifice.

12. The method of claim 11, further comprising:
inserting a cleat into the receiving orifice when the clamp is in the second position, the cleat including a third magnet having the first polarity.

13. The method of claim 12, wherein the cleat is cylindrical in shape.

14. The method of claim 12, further comprising:
aligning the third magnet with the first magnet to move the clamp towards a central axis of the annular receiving orifice to decrease the inner diameter across the receiving orifice; and
aligning the third magnet with the second magnet to move the clamp away from the central axis of the annular receiving orifice to increase the inner diameter across the receiving orifice.

15. A mechanical binding system including:
a cylindrical cleat with a first magnet positioned on an outer diameter of the cylindrical cleat; the cylindrical cleat being configured to be inserted into a pedal, the cylindrical cleat being configured to be locked into the pedal based on a first angular positioning of the first magnet, the cylindrical cleat being configured to be released from the pedal based on a second angular positioning of the first magnet.

16. The mechanical binding system of claim 15, further comprising:
a second magnet positioned on a clamp of the pedal, the second magnet being configured to be aligned with the first magnet at the first angular offset;
a third magnet positioned on the clamp of the pedal the third magnet being configured to be aligned with the first magnet at the second angular offset.

17. The mechanical binding system of claim 16, wherein the cleat only includes magnets of a first polarity and does not have magnets of a second polarity.

18. The mechanical binding system of claim 16, wherein the cleat includes a plurality of magnets, the plurality of magnets including the first magnet.

* * * * *